March 22, 1966   J. D. ANDERSON   3,241,658
PLASTIC HANDLES IN BUNDLE FORM
Filed Nov. 19, 1964
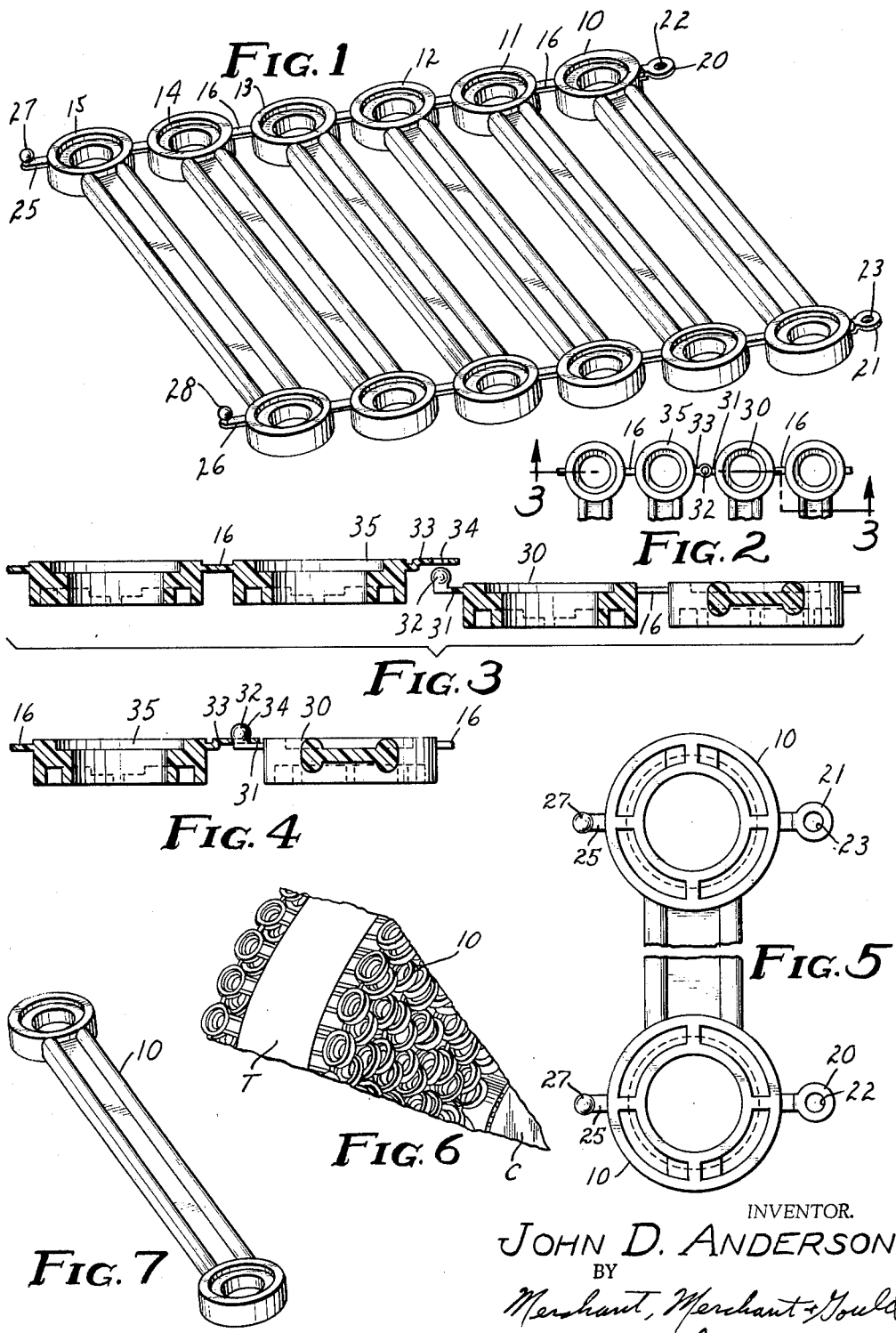
INVENTOR.
JOHN D. ANDERSON
BY
Merchant, Merchant & Gould
ATTORNEYS

Patent text

3,241,658
PLASTIC HANDLES IN BUNDLE FORM
John D. Anderson, St. Paul, Minn., assignor to Bechik Products, Inc., St. Paul, Minn., a corporation of Minnesota
Filed Nov. 19, 1964, Ser. No. 412,433
2 Claims. (Cl. 206—59)

The present invention pertains to apparatus for forming handles into bundles and more particularly to apparatus utilized in quickly connecting handles into long chains so they may be rolled into bundles for ease in handling and shipping.

Previous to this invention when handles were shipped or stored they had to be packed individually in containers or in some instances a plurality of handles were produced simultaneously which were connected by means of plastic webbing or the like and each group or plurality of handles was individually packed in containers. A great deal of time and effort is used in packing these handles for storing or shipping and much extra expense is required to provide containers therefor.

In the present invention the handles are either produced singly as in FIG. 5 or in a group as in FIGS. 1 and 3 and connecting means are provided with each handle or group of handles so that they may be connected in parallel. A long chain of the connected handles is then rolled into a convenient bundle and held in place by some means such as tape or the like. This bundle may then be conveniently stored or shipped without the use of extra containers and the individual handles are easily accessible at some later time. Thus, a great deal of time is saved in preparing the handles for storage or shipping, a large amount of expense is saved since containers and the like are not necessary, and much time is saved in procuring the handles for use since they are easily accessible.

It is an object of this invention to provide plastic handles in bundle form.

It is another object of this invention to provide plastic handles which are easily connected together for shipping or storage.

It is another object of this invention to provide plastic handles which are quickly accessible after shipping or storage.

These and other objects of this invention will become apparent to those skilled in the art upon consideration of the accompanying specification, claims, and drawings.

Referring to the drawings wherein like characters indicate like parts throughout the figures:

FIG. 1 is a perspective view of the present invention;

FIG. 2 is a top plan view showing one end of the invention;

FIG. 3 is a view of the present invention in the disconnected position along the irregular line 3—3 in FIG. 2;

FIG. 4 is a view similar to FIG.3 of the present invention in the connected position;

FIG. 5 is a bottom plan view showing one side of the present invention, some parts broken away;

FIG. 6 shows how a large number of handles may be connected and rolled and secured around a core for storage; and FIG. 7 is a perspective view of a single finished handle.

For the sake of description mattress handles similar to that described in the Michael Bechik patent, No. 2,986,748, are utilized. However, it should be understood that this invention will operate for different types of handles or other elongated plastic devices which may be adapted to the present invention.

FIG. 1 illustrates a plurality of mattress handles 10–15 as they appear after being removed from the mold. In the present invention six handles are illustrated as being molded simultaneously and connected by means of a perpendicular, integral web 16 of plastic. The plastic web 16 holds the handles firmly together in convenient groups and may be simply broken off to provide a finished handle as shown in FIG. 7. While six handles are illustrated as being molded simultaneously in the present embodiment it should be understood that any convenient number of handles could be molded simultaneously, including one, and the present invention would be operable thereon.

In FIG. 1 a pair of projections 20 and 21 which are molded as an integral portion of handle 10 project perpendicular from separate ends of handle 10 in a direction opposite to handle 11. Projections 20 and 21 have orifices 22 and 23, respectively, therethrough, the axis of which is perpendicular to a plane containing the handles 10–15. The projections 20 and 21 are a thin plastic similar to the web 16 and are somewhat resilient in nature so that orifices 22 and 23 may be extended slightly, radially and will return to their original shape.

A second pair of projections 25 and 26, which are molded as an integral portion of the handle 15, project in a perpendicular direction from the handle 15 and away from the handle 14. The projections 25 and 26 are a thin plastic similar to the web 16 and have molded as integral portions thereof a pair of expansions 27 and 28 respectively. Expansions 27 and 28 are illustrated in this embodiment simply as small plastic balls having a radius slightly larger than orifices 22 and 23 and extending from projections 25 and 26, respectively, in a direction perpendicular to a plane containing handles 10–15. It should be understood that while orifices 22 and 23 are shown as round holes they could take on any shape as long as the dimensions of the expansions which are to mate therewith, in a manner to be described, are similarly shaped.

In FIGS. 2 and 3 one end of a pair of handles 30 and 35 having other handles attached thereto by means of a web 16 can be seen in a parallel position. A projection 31 ending in an expansion 32 integrally molded to handle 30 is in juxtaposition but disconnected from a projection 33 integrally molded to handle 35. In FIG. 4 a slightly different view of the handles 30 and 35 is illustrated in which the expansion 32 is engaged with an orifice 34 in the projection 33. As can be seen the handles 30 and 35 are firmly connected together. It should be noted that the portion of projection 33 having orifice 34 therein is slightly offset so that upon connection with expansion 32 on projection 31 the handles lie in the same plane. The expansion 32 has a diameter which is slightly larger than the orifice 34, however, due to the resiliency of the projection 33 the expansion 32 can be forced through the orifice 34 after which the orifice 34 will return to its original size. Thus, the handles 30 and 35 cannot accidentally be disconnected or will not easily fall apart.

In the operation of the present invention, handles, such as mattress handles, are molded in any convenient group and the connecting means comprising projections 20 and 21, with their respective orifices 22 and 23, and projections 25 and 26, with their respective expansions 27 and 28, are molded as integral portions of the handles at the separate outside ends. To store or ship a large quantity of handles 10 a plurality of groups are connected together by pushing the expansions through the mating orifices to form a long chain which is then rolled on a core into a bundle and secured by some means such as tape T, see FIG. 6. The cylindrical bundle of handles is easily shipped or stored for an indefinite period of time. The handles may be utilized by simply breaking off the web 16 and the projections.

Since the projections 20, 21, 25 and 26 are made very thin similar to the web 16 they use very little material and are therefore inexpensive. Also, since the projections are molded with the handles there is no extra time or effort wasted in producing them. Thus, apparatus is disclosed which is conveniently utilized to store or ship handles or the like and which is extremely simple and inexpensive to construct.

While I have shown and described as a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A package of plastic handles comprising a roll of handles comprising a plurality of elongated handles connected to each other in parallel relationship, each handle having a first flexible and severable projection integral therewith on the side at each end thereof and an orifice extending in a direction substantially perpendicular along a preselected axis through each said first projection; each said handle having a second flexible and severable projection integral therewith and directly opposite to said first projections, and an expansion member extending in a direction substantially perpendicular along a preselected axis from the said second projection and having a dimension slightly larger than said orifice, the said expansion members of one handle mating with said orifices of an adjacent handle, the said preselected axes of said expansion members and said orifices being parallel to each other, the said expansion members and the said orifices of the connected handles in the roll lying in a substantially radial plane with respect to the axis of the roll, a securing means positioned around the roll.

2. The package of claim 1 wherein the handles are formed in groups of plural handles connected to each other by flexible, severable webs at each end thereof in alignment with the said projections.

References Cited by the Examiner

UNITED STATES PATENTS

| | | | |
|---|---|---|---|
| 2,964,171 | 12/1960 | Chadwick | 206—56 |
| 2,986,748 | 6/1961 | Bechik | 5—345 |
| 3,016,136 | 1/1962 | Poupitch | 206—56 |

FOREIGN PATENTS 217,730 10/1958 Australia.

THERON E. CONDON, *Primary Examiner.*

W. T. DIXON, *Assistant Examiner.*